US012621781B2

(12) United States Patent
Talvitie et al.

(10) Patent No.: US 12,621,781 B2
(45) Date of Patent: May 5, 2026

(54) SENSING IN CELLULAR COMMUNICATION NETWORKS

(71) Applicant: Nokia Technologies Oy, Espoo (FI)

(72) Inventors: Jukka Olavi Talvitie, Tampere (FI); Esa Tapani Tiirola, Oulu (FI); Oskari Tervo, Oulu (FI); Kari Juhani Hooli, Oulu (FI); Sami-Jukka Hakola, Oulu (FI); Mikko Valkama, Nokia (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 272 days.

(21) Appl. No.: 18/500,356

(22) Filed: Nov. 2, 2023

(65) Prior Publication Data

US 2024/0196349 A1    Jun. 13, 2024

(30) Foreign Application Priority Data

Dec. 9, 2022    (FI) ..................................... 20226093

(51) Int. Cl.
    *H04W 56/00*        (2009.01)
    *H04W 74/00*        (2009.01)
    *H04W 74/0808*      (2024.01)

(52) U.S. Cl.
    CPC ..... *H04W 56/0015* (2013.01); *H04W 74/006* (2013.01); *H04W 74/0808* (2013.01)

(58) Field of Classification Search
    CPC ........... H04W 56/001; H04W 56/0015; H04W 76/002; H04W 76/006; H04W 76/08;
    (Continued)

(56) References Cited

U.S. PATENT DOCUMENTS

2019/0123992 A1*   4/2019   Ly .......................... H04W 24/10
2020/0154446 A1    5/2020   Yerramalli et al.
(Continued)

FOREIGN PATENT DOCUMENTS

WO    2022/001624 A1    1/2022
WO    2022/078726 A1    4/2022

OTHER PUBLICATIONS

Notice of Allowance received for corresponding European Patent Application No. 23207647.1, dated Mar. 17, 2025, 8 pages.
(Continued)

*Primary Examiner* — Paul H. Masur
(74) *Attorney, Agent, or Firm* — Carter, DeLuca & Farrell LLP

(57)    ABSTRACT

According to an example aspect of the present disclosure, there is provided a method comprising, determining, by an apparatus, first information for reception of a synchronization signal block from a cell of a source wireless network node, determining, by the apparatus, second information for reception of at least one part of a system information block from the cell of the source wireless network node, wherein the second information is unchanged compared to at least one part of a previous system information block, receiving, by the apparatus, the synchronization signal block and the system information block and performing, by the apparatus, processing of the first information of the synchronization signal block and the second information of the at least one part of the system information block.

17 Claims, 7 Drawing Sheets

(58) Field of Classification Search
CPC ........... H04W 76/0808; H04W 74/002; H04W
74/006; H04W 74/0808
See application file for complete search history.

(56) References Cited

U.S. PATENT DOCUMENTS

| | | | | |
|---|---|---|---|---|
| 2020/0252858 | A1* | 8/2020 | Wang | H04W 48/08 |
| 2020/0374083 | A1* | 11/2020 | Wang | A63F 13/803 |
| 2022/0150820 | A1 | 5/2022 | Newman et al. | |
| 2022/0231811 | A1* | 7/2022 | Tian | H04L 5/0094 |
| 2022/0353793 | A1* | 11/2022 | Gao | H04W 48/16 |

OTHER PUBLICATIONS

Extended European Search Report received for corresponding European Patent Application No. 23207647.1, dated Apr. 22, 2024, 9 pages.

Golzadeh et al., "Downlink Sensing in 5G-Advanced and 6G:SIB1-assisted SSB Approach", IEEE 97th Vehicular Technology Conference (VTC2023—Spring), Jun. 20-23, 2023, 7 pages.

"New SID on Integrated Sensing and Communication", 3GPP SA WG1 Meeting #97e, S1-220191, Agenda: 4, China Mobile, Feb. 14-24, 2022, 4 pages.

"New SID on integrating sensing with communication in NR", 3GPP TSG-RAN Meeting #97-e, RP-222293, Agenda: 9.1.1, China Telecom, Sep. 12-16, 2022, 5 pages.

"3rd Generation Partnership Project; Technical Specification Group TSG SA; Feasibility Study on Integrated Sensing and Communication (Release 19)", 3GPP TR 22.837, V0.1.0, May 2022, pp. 1-13.

Sturm et al., "Waveform Design and Signal Processing Aspects for Fusion of Wireless Communications and Radar Sensing", Proceedings of the IEEE, vol. 99, No. 7, Jul. 2011, pp. 1236-1259.

Braun, "OFDM Radar Algorithms in Mobile Communication Networks", Dissertation, 2014, pp. 1-195.

Kiviranta et al., "5G Radar: Scenarios, Numerology and Simulations", International Conference on Military Communications and Information Systems (ICMCIS), May 14-15, 2019, 6 pages.

Cui et al., "Integrated Sensing and Communications via 5G NR Waveform: Performance Analysis", IEEE International Conference on Acoustics, Speech and Signal Processing (ICASSP), May 23-27, 2022, pp. 8747-8751.

"Msc-generator", Sourceforge, Retrieved on Nov. 14, 2023, Webpage available at : https://sourceforge.net/projects/msc-generator/.

"3rd Generation Partnership Project; Technical Specification Group Radio Access Network; NR; Physical layer procedures for data (Release 17)", 3GPP TS 38.214, V17.3.0, Sep. 2022, pp. 1-232.

"3rd Generation Partnership Project; Technical Specification Group Radio Access Network; NR; Multiplexing and channel coding (Release 17)", 3GPP TS 38.212, V17.3.0, Sep. 2022, pp. 1-201.

"3rd Generation Partnership Project; Technical Specification Group Radio Access Network; NR; Physical layer procedures for control (Release 17)", 3GPP TS 38.213, V17.3.0, Sep. 2022, pp. 1-260.

"Network energy saving techniques", 3GPP TSG RAN WG1 Meeting #109-e, R1-2204424, Agenda: 9.7.2, Lenovo, May 9-20, 2022, pp. 1-3.

Office action received for corresponding Finnish U.S. Appl. No. 20/226,093, dated May 5, 2023, 12 pages.

Liu et al., "Integrated Sensing and Communications: Toward Dual-Functional Wireless Networks for 6G and Beyond", IEEE Journal on Selected Areas in Communications, vol. 40, No. 6, Jun. 2022, pp. 1728-1767.

Zhang et al., "Perceptive Mobile Networks: Cellular Networks With Radio Vision via Joint Communication and Radar Sensing", IEEE Vehicular Technology Magazine, vol. 16, No. 2, Jun. 2021, pp. 20-30.

"3rd Generation Partnership Project; Technical Specification Group Radio Access Network; NR; Radio Resource Control (RRC) protocol specification (Release 16)", 3GPP TS 38.331, V16.10.0, Sep. 2022, pp. 1-971.

* cited by examiner

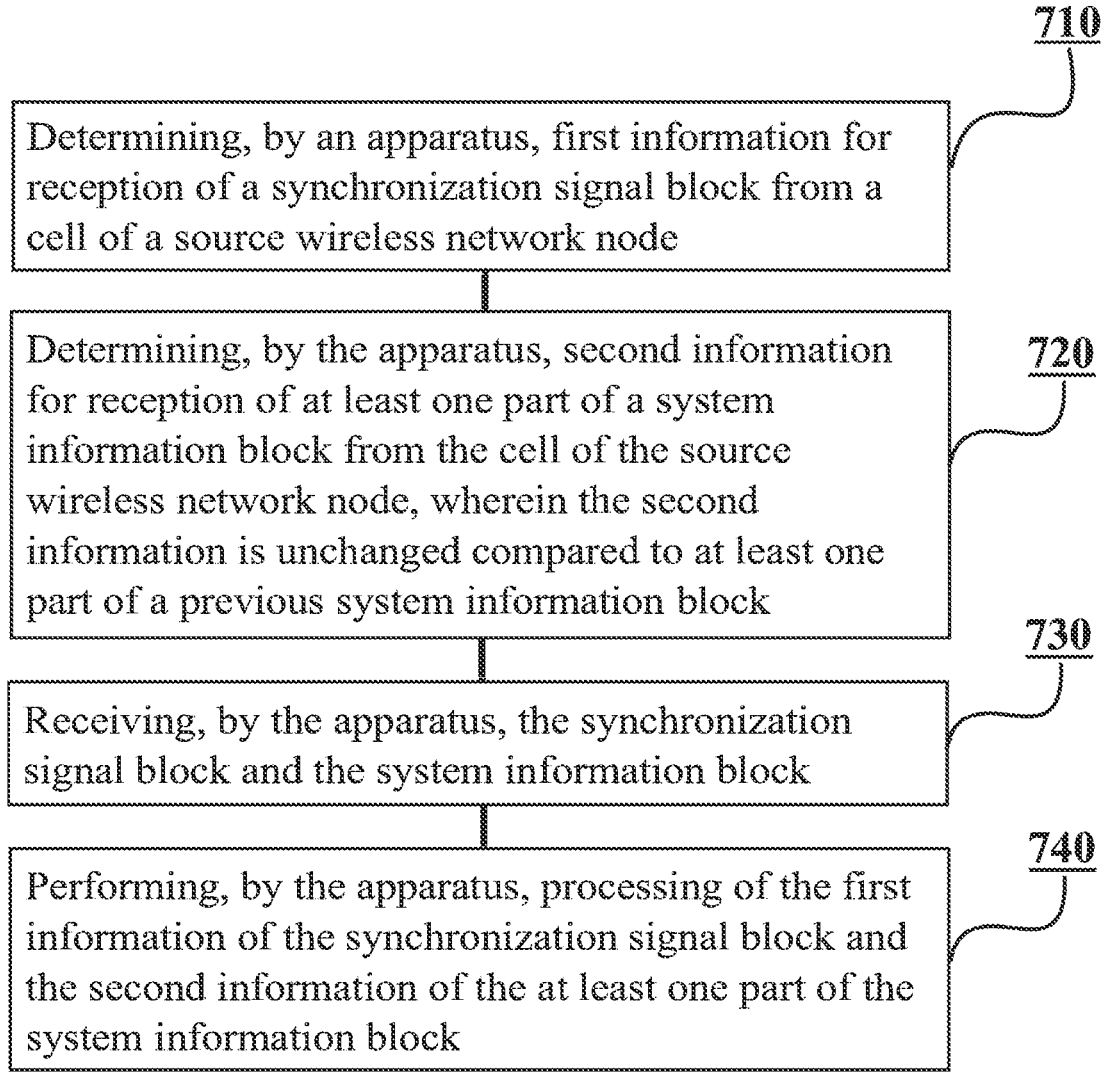

Determining, by an apparatus, first information for reception of a synchronization signal block from a cell of a source wireless network node

710

Determining, by the apparatus, second information for reception of at least one part of a system information block from the cell of the source wireless network node, wherein the second information is unchanged compared to at least one part of a previous system information block

720

Receiving, by the apparatus, the synchronization signal block and the system information block

730

Performing, by the apparatus, processing of the first information of the synchronization signal block and the second information of the at least one part of the system information block

SENSING IN CELLULAR COMMUNICATION NETWORKS

RELATED APPLICATION

This application claims priority from, and the benefit of, Finnish Application No. 20226093, filed on Dec. 9, 2022, the contents of which is incorporated herein by reference in its entirety.

FIELD

Various example embodiments relate in general to cellular communication networks and more specifically, to sensing in such networks.

BACKGROUND

Radio-based channel sensing may be considered as an emerging technology at least for cellular communication networks. Possible use cases of radio-based sensing comprise, for example, intruder detection (home, railway, highway), rainfall monitoring, sensing assisted transportation (maneuvering and navigation, cross-roads clearance), management of unmanned aerial vehicles (trajectory tracing, collision avoidance), sleep monitoring, positioning and health monitoring. Sensing may be generally used to sense environment, comprising also static or other objects which might not be connected to a network, like passive objects. Radio-based sensing may be exploited in various cellular communication networks, such as, in cellular communication networks operating according to 5G radio access technology and/or future 6G radio access technology. 5G radio access technology may also be referred to as New Radio, NR, access technology. 3rd Generation Partnership Project, 3GPP, develops standards for 5G/NR. In general, there is a need to provide enhanced methods, apparatuses and computer programs for enhancing radio-based sensing in cellular communication networks. Such enhancements may also be beneficial in other wireless communication networks, such as in 6G networks in the future.

SUMMARY

According to some aspects, there is provided the subject-matter of the independent claims. Some example embodiments are defined in the dependent claims.

The scope of protection sought for various example embodiments of the disclosure is set out by the independent claims. The example embodiments and features, if any, described in this specification that do not fall under the scope of the independent claims are to be interpreted as examples useful for understanding various example embodiments of the disclosure.

According to a first aspect of the present disclosure, there is provided an apparatus comprising at least one processor and at least one memory storing instructions that, when executed by the at least one processor, cause the apparatus at least to determine first information for reception of a synchronization signal block from a cell of a source wireless network node, determine second information for reception of at least one part of a system information block from the cell of the source wireless network node, wherein the second information is unchanged compared to at least one part of a previous system information block, receive the synchronization signal block and the system information block and perform processing of the first information of the synchronization signal block and the second information of the at least one part of the system information block. The apparatus of the first aspect may be a user equipment or observing wireless network node, or a control device configured to control the functioning thereof, possibly when installed therein.

Example embodiments of the first aspect may comprise at least one feature from the following bulleted list or any combination of the following features:

- wherein the stored instructions further cause, when executed by the at least one processor, the apparatus at least to perform the processing of the first information and the second information by performing at least one of the following: channel sensing, skipping reception of the system information block, skipping channel decoding of the system information block, or considering the system information block as a known signal;
- wherein the processing of the first information and the second information is sensing based on the first information and the second information.
- wherein the system information block is a System Information Block 1, SIB1;
- wherein the system information block has a predetermined periodicity;
- wherein the at least one part of the system information block comprises unchanged information compared to the previous system information block;
- wherein the stored instructions further cause, when executed by the at least one processor, the apparatus at least to receive an indication from the wireless network node, the indication indicating that the second information of the at least one part of the system information block is changed;
- wherein the system information block comprises the at least one part comprising the second information unchanged compared to a previous system information block and at least one other part comprising variable information compared to the previous system information block;
- wherein the part and the at least one other part of the system information block are multiplexed in at least one of time or frequency;
- wherein the at least one part of the system information block comprises unchanged information compared to a previous system information block, wherein the unchanged information is valid for a time period;
- wherein the stored instructions further cause, when executed by the at least one processor, the apparatus at least to detect and decode another system information block after an end of the time period and determine, based on the decoded another system information block, information for reception of at least one part of a subsequent system information block from the cell of the source wireless network node;
- wherein the stored instructions further cause, when executed by the at least one processor, the apparatus at least to determine third information for reception of a physical downlink control channel from the cell of the source wireless network node, wherein the third information is unchanged compared to a previous physical downlink channel, receive the physical downlink control channel and perform sensing based on the first information of the synchronization signal block and the second information of the at least one part of the system information block and the third information of the physical downlink control channel.

According to a second aspect of the present disclosure, there is provided an apparatus comprising at least one processor and at least one memory storing instructions that, when executed by the at least one processor, cause the apparatus at least to determine first information for transmission of a synchronization signal block, determine second information for transmission of at least one part of a system information block, wherein the second information is unchanged compared to at least one part of a previous system information block and transmit the synchronization signal block and the system information block. The apparatus of the second aspect may be a source wireless network node, or a control device configured to control the functioning thereof, possibly when installed therein.

According to a third aspect of the present disclosure, there is provided an apparatus comprising means for determining first information for reception of a synchronization signal block from a cell of a source wireless network node, means for determining second information for reception of at least one part of a system information block from the cell of the source wireless network node, wherein the second information is unchanged compared to at least one part of a previous system information block, means for receiving the synchronization signal block and the system information block and means for performing processing of the first information of the synchronization signal block and the second information of the at least one part of the system information block. The apparatus of the third aspect may be a user equipment or observing wireless network node, or a control device configured to control the functioning thereof, possibly when installed therein.

According to a fourth aspect of the present disclosure, there is provided an apparatus comprising means for determining first information for transmission of a synchronization signal block, means for determining second information for transmission of at least one part of a system information block, wherein the second information is unchanged compared to at least one part of a previous system information block and means for transmitting the synchronization signal block and the system information block. The apparatus of the fourth aspect may be a source wireless network node, or a control device configured to control the functioning thereof, possibly when installed therein.

According to a fifth aspect, there is provided a first method comprising determining, by an apparatus, first information for reception of a synchronization signal block from a cell of a source wireless network node, determining, by the apparatus, second information for reception of at least one part of a system information block from the cell of the source wireless network node, wherein the second information is unchanged compared to at least one part of a previous system information block, receiving, by the apparatus, the synchronization signal block and the system information block and performing, by the apparatus, processing of the first information of the synchronization signal block and the second information of the at least one part of the system information block. The apparatus of the fifth aspect may be a user equipment or observing wireless network node, or a control device configured to control the functioning thereof, possibly when installed therein.

According to a sixth aspect, there is provided a second method comprising, means for determining, by an apparatus, first information for transmission of a synchronization signal block, means for determining, by the apparatus, second information for transmission of at least one part of a system information block, wherein the second information is unchanged compared to at least one part of a previous system information block and means for transmitting, by the apparatus, the synchronization signal block and the system information block. The apparatus of the sixth aspect may be a source wireless network node, or a control device configured to control the functioning thereof, possibly when installed therein.

According to a seventh aspect of the present disclosure, there is provided a non-transitory computer readable medium having stored thereon a set of computer readable instructions that, when executed by at least one processor, cause an apparatus to at least to perform the first method. According to an eighth aspect of the present disclosure, there is provided a non-transitory computer readable medium having stored thereon a set of computer readable instructions that, when executed by at least one processor, cause an apparatus to at least to perform the second method.

According to a ninth aspect of the present disclosure, there is provided a computer program comprising instructions which, when the program is executed by an apparatus, cause the apparatus to carry out the first method. According to a tenth aspect of the present disclosure, there is provided a computer program comprising instructions which, when the program is executed by an apparatus, cause the apparatus to carry out the second method.

According to a tenth aspect of the present disclosure, there is provided an apparatus comprising at least one processor and at least one memory storing instructions that, when executed by the at least one processor, cause the apparatus at least to determine second information for reception of at least one part of a system information block from a source wireless network node, wherein the second information is unchanged compared to at least one part of a previous system information block, receive the system information block and perform processing of the second information. The processing of the second information is at least one of the following: sensing based on the second information, skipping decoding of the system information block, or considering the system information block as a known signal. The apparatus of the tenth aspect may be a user equipment or observing wireless network node, or a control device configured to control the functioning thereof, possibly when installed therein.

BRIEF DESCRIPTION OF THE DRAWINGS

FIG. 7 illustrates a flow graph of a first method in accordance with at least some example embodiments.

DETAILED DESCRIPTION

Sensing in cellular communication networks may be enhanced by the procedures described herein. More specifically, sensing in cellular communication networks may be enhanced by utilizing jointly transmissions of Synchronization Signal Blocks, SSBs, and System Information Block 1, SIB1, for example for sensing a channel. A SIB1 may refer to higher layer signalling content while a Physical Downlink Shared Channel, PDSCH, may be the physical channel that carries the SIB1. A Physical Downlink Control Channel, PDCCH, may be used to schedule time and frequency resources for the PDSCH.

At least one part of a SIB1 may comprise information which is suitable for sensing, like unchanged information compared to a previous SIB1, such as a previously decoded SIB1. Hence, the SIB1 transmission may be exploited to provide wider bandwidth and longer time for sensing, and enhanced measurement time-granularity. Sensing performance, such as ranging accuracy and velocity estimation accuracy, may be therefore substantially improved without increasing radio interface overhead.

Figure 1:
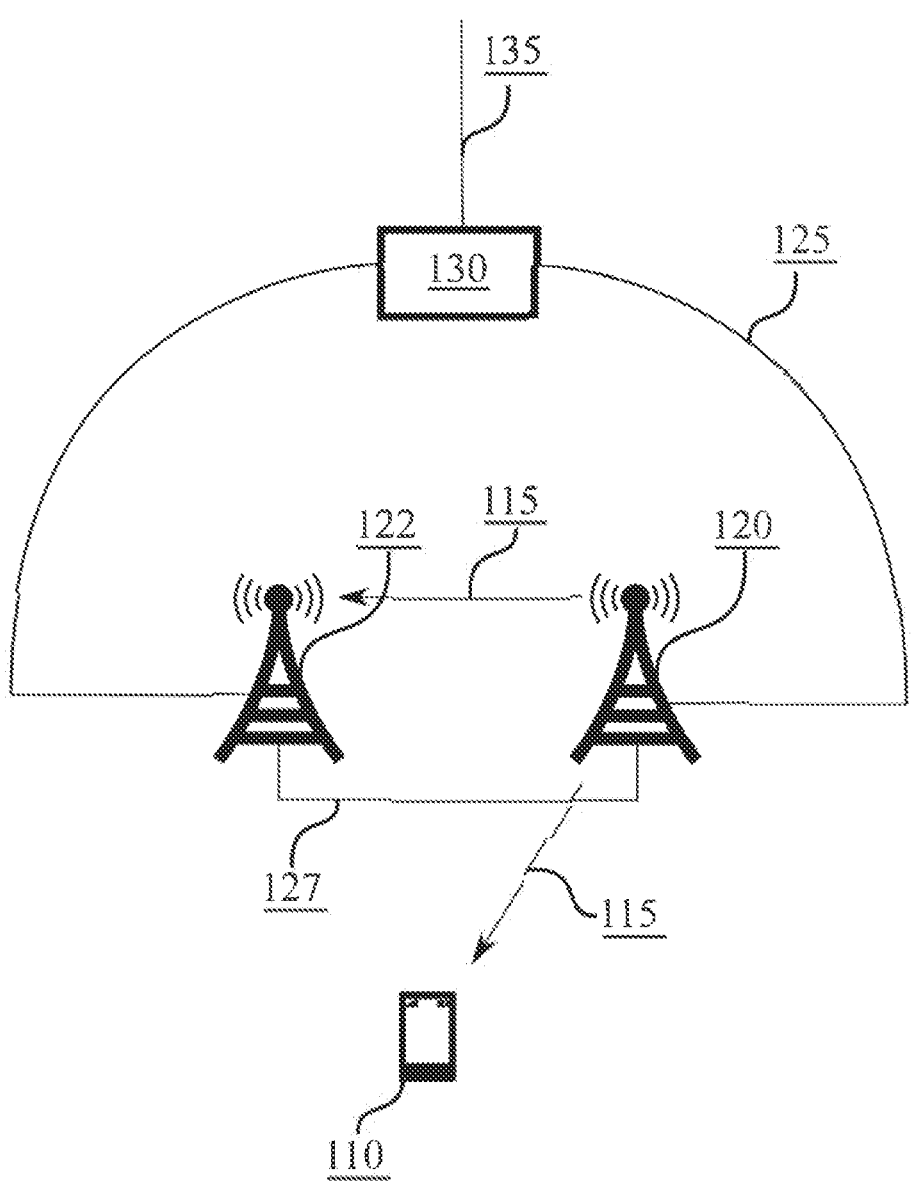
FIG. 1 illustrates an example of a network scenario in accordance with at least some example embodiments.

FIG. 1 illustrates an example of a network scenario in accordance with at least some example embodiments. According to the example scenario of FIG. 1, there may be a cellular communication system, which comprises UE 110, source wireless network node 120, observing wireless network node 122 and core network element 130. UE 110 may be connected to source wireless network node 120 via air interface 115. Source wireless network node 120 may be considered as a serving node of UE 110 and one cell of wireless network node 120 may be a serving cell of UE 110.

In some example embodiments, air interface 115 may be a beam-based air interface. UE 110 and observing wireless network node 122 may receive and measure signals transmitted by source wireless network node 120 over air interface 115. Hence, UE 110 and observing wireless network node 122 may perform channel sensing based on signal transmitted by source wireless network node 120 over air interface 115. In case of Joint Communication and Sensing, JCAS, source wireless network node 120 may perform sensing. For example, source wireless network node 120 may perform sensing, like mono-static sensing, in addition to bi-static sensing by observing wireless network node 122 or UE 110.

In some example embodiments, a mono-static radar may allow for sensing with one wireless network node, but not more than one, where a receiver and a transmitter may be co-located and the mono-static radar may exploit an entire transmitted grid known to the receiver. In a bi-static or a multi-static case, a transmitter and a receiver may be separately placed in several nodes and the receiving nodes may have prior knowledge of the transmitted signal, meaning that sensing enablers may be common reference signals or additional synchronization signaling between all wireless network nodes. Signal processing related to sensing may be, e.g., correlation based signal detection to obtain range and/or velocity relationship for the reflected signals. So also the delay and Doppler shift of the received signal reflection may be estimated for the range and velocity, and potentially an angle of arrival as well.

Thus, transmitted and received in-phase and quadrature samples may be used for channel sensing in addition to the received power. The fundamental aspects of channel sensing may be delay estimation and Doppler estimation, which map to target/object distance and velocity. Depending on more specific arrangements related to an antenna system, target direction may be estimated, which together with distance maps already to a target position. Channel sensing might be also referred to as sensing, radio-based sensing or object sensing.

UE 110 may comprise, for example, a smartphone, a cellular phone, a Machine-to-Machine, M2M, node, Machine-Type Communications, MTC, node, an Internet of Things, IoT, node, a car telemetry unit, a laptop computer, a tablet computer or, indeed, any kind of suitable wireless terminal. Air interface 115 between UE 110 and wireless network nodes 120, 122 may be configured in accordance with a Radio Access Technology, RAT, which both UE 110 and wireless network nodes 120, 122 are configured to support. Examples of cellular RATs include Long Term Evolution, LTE, New Radio, NR, which may also be known as fifth generation, 5G, radio access technology, 6G, and MulteFire. For instance, UE 110 and wireless network nodes 120, 122 may be configured to operate according to at least one 3rd Generation Partnership Project, 3GPP, standard.

For example in the context of LTE, wireless network nodes 120 and 122 may be referred to as eNBs while wireless network nodes: source wireless network node 120, and observing wireless node 122 may be referred to as gNBs in the context of NR. Wireless network nodes 120 and 122 may, in general, be referred to as base stations, base station nodes or radio access nodes. In some example embodiments, wireless network nodes 120 and 122 may comprise entities like a gNB-Distributed Unit, DU, and gNB-Centralized Unit, CU. The gNB-DU and the g-NB-CU may be connected by an interface such as F1.

In some example embodiments, wireless network nodes 120 and 122 may be referred to as Transmission and Reception Points, TRPs, or control multiple TRPs that may be co-located or non-co-located. In any case, example embodiments of the present disclosure are not restricted to any particular wireless technology. Instead, example embodiments may be exploited in any wireless communication system, wherein channel sensing may be performed based on SSBs and SIB1s.

Wireless network nodes 120 and 122 may be connected, directly or via at least one intermediate node, with core network 130 via interface 125. Core network 130 may be, in turn, coupled via interface 135 with another network (not shown in FIG. 1), via which connectivity to further networks may be obtained, for example via a worldwide interconnection network. Wireless network nodes 120 and 122 may be connected with each other directly via inter-BS interface 127, e.g., using an Xn interface or an X2 interface. In some example embodiments, direct inter-BS interface 127 may be absent though. In such a case, wireless network nodes 120 and 122 may communicate with each other via interface 125 and core network 130.

In some example embodiments, the network scenario may comprise a relay node instead of, or in addition to, at least one of UE 110, source wireless network node 120 and observing wireless network node 122. Relaying may be used for example when operating on millimeter-wave frequencies. One example of the relay node may be an Integrated Access and Backhaul, IAB, node. The IAB node may be referred to as a self-backhauling relay as well. Another example of a relay may be an out-band relay. For instance, the relay node may comprise two parts:

1) Distributed Unit, DU, part which may facilitate functionalities of wireless network node 120, such as a gNB. Thus, in some example embodiments, the DU part of a relay may be referred to as wireless network node 120 or 122 and the DU may perform tasks of wireless network node 120 or 122;

2) Mobile Termination, MT, part which may facilitate functionalities of UE 110, i.e., a backhaul link which may be the communication link between a parent node (DU), such as a DU part of wireless network node 120 or 122, and the relay, such as an IAB node. In some example embodiments, the MT part may be referred to as UE 110 and perform tasks of UE 110.

Integrated sensing and communications functionalities may be exploited in various wireless communication networks, such as in cellular communication networks, like 5G/NR networks. In addition, integrated sensing and communications functionalities may be exploited at least in upcoming 6G networks. At least some use cases may require bi-static sensing operation, where source wireless network node 120 may act as a transmitter and UE 110 may act as a receiver, and potentially observing wireless network node 122 as well. To support this kind of bi-static sensing operation, frequent and wide bandwidth transmissions of known reference signals may be required for accurate and low-latency sensing operation.

The use of such reference signals would increase the system overhead and reduce the communications capacity though. In addition, considering the ever-tightening requirements for energy-efficiency, the introduction of additional reference signals would have a negative influence on the energy budget. Thus, it would be beneficial to bring sensing capability for example to 5G-Advanced without introducing additional reference signals. In some example embodiments of the present disclosure, existing signals may be therefore utilized for channel sensing, to make best use of the system for both sensing and communications.

Regarding the overhead and energy issues, sensing-related reference signals may introduce a larger negative impact compared to, for example, positioning-related reference signals. This is because, in many sensing-related use cases, like in case of home intruder detection, it would be beneficial if the sensing functionality would work in always-on principle to enable continuous monitoring and sensing of the environment. On the other hand, a positioning service may be needed only during an active operation of UE 110.

In cellular communication networks, synchronization signals and common broadcast channels, such as Primary Synchronization Signal, PSS, Secondary Synchronization Signal, SSS, and Physical Broadcast Channel, PBCH, in 5G NR, may be repeatedly transmitted which is generally good for sensing. However, said synchronization signals and common broadcast channels may lack in sensing performance due to limited bandwidth, which would further limit the range estimation capabilities. Also, said synchronization signals and common broadcast channels may lack in sensing performance due to limited duration, which would further limit the velocity estimation capabilities. Thus, in some example embodiments, the use of said synchronization signals and common broadcast channels may be enhanced for channel sensing. More specifically, the use of said synchronization signals and common broadcast channels for channel sensing may be incorporated with the use of SIB1 transmission framework, to enable enhanced sensing capabilities.

Some example embodiments may be applied to enable, e.g., improved sensing performance for a mono/bi-static downlink-signal-based sensing. For instance, joint utilization of SSBs, and semi-persistent downlink transmission of SIB1 transmitted on a PDSCH and associated PDCCH information (Type #0-PDCCH information), also referred to as Control Resource Set #0, CORESET #0, may be enabled efficiently. In some example embodiments, said associated PDCCH information may also be referred to as a downlink assignment or Downlink Control Information, DCI. CORESET #0 may refer to Type #0-PDCCH on CORESET #0 resources although also other PDCCHs may be transmitted on the CORESET #0.

In some example embodiments, each of the SSB and SIB1 may have a predetermined transmission periodicity, defined in a 3GPP standard for example, to ensure continuous sensing availability. For instance, transmission periodicity may be defined as 5-160 ms for the SSB and 160 ms for the SIB1/CORESET #0. For cell search, the SSB periodicity assumed by UE 110 may be 20 ms, e.g., in 5G/NR networks. In some example embodiments, it may be defined in a 3GPP standard that SSBs need to be transmitted by source wireless network node 120 with a given periodicity. However, source wireless network node 120 may be allowed to decide how to deal with PDCCH for CORESET #0 and SIB1. For example, source wireless network node 120 may decide whether or not to transmit PDCCH for CORESET #0 and SIB1. PDCCH for CORESET #0 may correspond to Type #0-PDCCH and used to schedule SIB1 (transmitted via PDSCH) In any case, the transmission interval should be enough frequent though, or otherwise, the initial access performance would be decreased, i.e., delayed.

Information for reception of a SSB may be referred to as first information and information for reception of at least one part of a SIB1 may be referred to as second information. The first information may comprise a content of the SSB and resources of the SSB. The second information may be unchanged compared to at least one part of a previous SIB1, like a previously decoded SIB1. That is, even though in some example embodiments a previously decoded SIB1 is used as an example, the example embodiments may be applied similarly when the second information is unchanged compared to at least one part of a previous SIB1.

The first information in SSBs, including PSS, SSS, and PBCH, may be considered static as a function of time, but the second information in SIB1 may vary over time. That is, the changes in the first information may be known if the timing of the cell is known. For instance, systemFrameNumber in a Master Information Block, MIB, may be known if the timing of the cell is known. However, in practice the SIB1, carrying for example mandatory information on random access, may remain constant for long times and change only infrequently. In some example embodiments of the present disclosure, sensing measurements based on SSB and SIB1 transmissions may be therefore obtained by not only the node transmitting SSBs and SIBs, like source wireless network node 120, but also both receivers, UE 110 and observing wireless network node 122.

In some example embodiments, a SIB1-optimized sensing framework may be provided. Possible changes in the SIB1 information, i.e., second information for channel sensing, may be handled for example as follows.

In some example embodiments, SIB1s may be assumed unchanged unless a change is separately indicated by source wireless network node 120. For instance, the information in SIB1s, or at least a part of it, may be assumed unchanged compared to a previously decoded SIB1. For instance, source wireless network node 120 may transmit an indication to UE 110, the indication indicating that information of SIB1 is changed. That is, the indication may indicate that the information, which has been unchanged compared to a previously decoded SIB1, has been changed now. In some example embodiments, multiple UEs may be informed separately, e.g., via a paging message. That is, UE 110 may receive the indication in a paging message. Other wireless network nodes may be informed via inter-BS interface 127, e.g., using Xn-signaling, to support for a bi-static sensing scenario. For instance, source wireless network node 120 may transmit the indication to observing wireless network node 122 via inter-BS interface 127.

UE 110 may use every SIB1 for sensing as long as they are unchanged, after the SIB1 has been decoded once. That is, UE 110 may use a received SIB1 for channel sensing if the received SIB1 is unchanged compared to a previously decoded SIB1. The received SIB1 may be a known signal, defined in a 3GPP standard for example. That is, one use case is to use PDCCH/SIB as always on known signal that may be used to improve channel estimation and/or frequency/time synchronization (similarly as a reference signal). In some example embodiments, source wireless network node 120 may configure the transmission periodicity according to channel sensing needs.

In some example embodiments, a SIB1 may be divided into two parts. A first part of the SIB1 may comprise unchanged information, compared to a first part of a previously decoded SIB1 for example, and a second part of the SIB1 may comprise variable information. The first part may thus comprise unchanged information that is feasible for channel sensing. Said information may be assumed practically as stable as the information in PBCH. Hence, the indication indicating the change may not be needed. If changes are needed, source wireless network node 120 may perform a system information update or a cell reset. The second part may comprise variable information that is not usable for channel sensing. The second part may be referred to as another part as well. In some example embodiments, there may be more than one second part, i.e., at least two other parts.

In some example embodiments, the first and the second parts of the SIB1 may be multiplexed, e.g., to maximize suitability for sensing. One potential reason may be to ensure that sensing part occupies high enough bandwidth, to increase range estimation accuracy accordingly For instance, the first part may be spread over a PDSCH bandwidth in a comb-like pattern. The PDSCH may be for transmission of the first and second parts of the SIB1.

In some example embodiments, SIB1s may be assumed unchanged for a predefined time period. That is, SIB1s may comprise unchanged information, compared to a previously decoded SIB1 for example, and said information may be assumed unchanged for the time period. UEs participating in sensing may be required to detect and decode a SIB1 at a beginning of each new time period. That is, for example UE 110 may determine that the time period has ended and after that, detect and decode the next SIB1. Other wireless network nodes may be informed via inter-BS interface 127, e.g., using Xn-signaling. For instance, source wireless network node 120 may transmit an indication about the change to observing wireless network node 122 via inter-BS interface 127. In some example embodiments, the SIB1 may comprise parameters for SIB1 transmission periodicity that source wireless network node 120 follows for the time period, as well as parameters, like period and time offset, defining the time period for the unchanged SIB1.

The SIB1 periodicity may be included in the SIB1 content to enable more dynamic adaptation, so that sensing may benefit from it compared to traditional system information signalling. For instance, the SIB1 may be transmitted more frequently than 160 ms to facilitate sensing. The periodicity of SIB1s may be adjustable, e.g., to adjust the trade-off between current needs for sensing and overhead caused by more frequent SIB1 transmissions, depending for example on the traffic load of the cell.

The at least one part of the SIB1, and potentially the associated PDCCH, may be defined to be always on and transmitted using a predefined content/resources/format. The predefined content/resources/format may be referred to as second information. The predefined content/resources/format for SIB1 may mean that the payload, time and frequency resources, coding, modulation, etc., are not changed. In the case of type #0 PDCCH, the payload, aggregation level or CORESET #0 resources used for type #0 PDCCH might not be changed. UE 110 may obtain such information when it decodes SIB1 correctly. The payload, aggregation level or CORESET #0 resources used for type #0 PDCCH may be referred to as third information.

That is, predefined (if not all) SSB occasions may be defined to comprise both, the SIB1 and the associated PDCCH. Alternatively, the SIB1 with predefined information, like at least one content, resources and format, may be triggered by means of the associated PDCCH, even though said information of the SIB may still be predefined. In some example embodiments, UE 110 may assume that the predefined SIB1 is transmitted only if the associated PDCCH is received.

The presence of "always on SIB1" may be indicated by source wireless network node 120 by means of broadcast signaling. For example, the SIB1, some other predefined SIBx or MIB may be used to indicate that the associated cell of source wireless network node 120 follows procedures defined for "always on SIB1".

The example embodiments of the present disclosure may be applied similarly for any other SIB with similar functionality than SIB1. That is, even though SIB1 is used as an example in the example embodiments of the present disclosure, the example embodiments of the present disclosure are not specifically limited to SIB1. Instead, SIB1 may be replaced with any other SIB with similar functionality. In some example embodiments, a system information block, like SIB1 or some other SIB with similar functionality, may comprise cell-specific information of the cell of source wireless network node 120. Alternatively, or in addition, a system information block, like SIB1 or some other SIB with similar functionality, may comprise Remaining Minimum System Information, RMSI.

Figure 2:
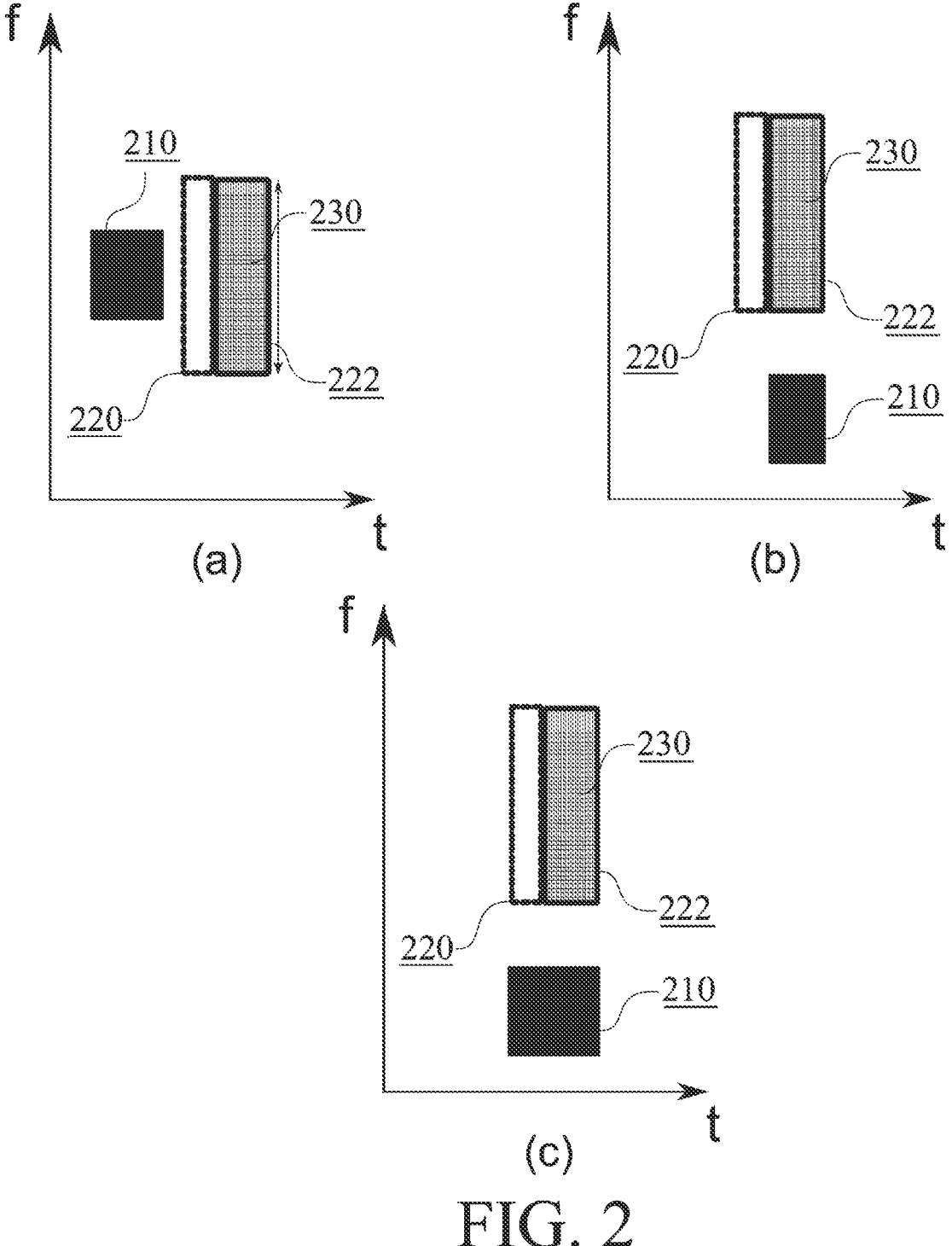
FIG. 2 illustrates a first example in accordance with at least some example embodiments.

FIG. 2 illustrates a first example in accordance with at least some embodiments. In FIG. 2, SSB is denoted by 210, CORESET #0 220 and SIB1 222. SIB1 may be carried on a PDSCH. In the first example illustrated in FIG. 2, SIB1 222 may comprise unchanged information 230 compared to a previously decoded SIB1.

FIG. 2 illustrates different exemplary multiplexing scenarios for SSB 210, CORESET #0 220 and SIB1 222. More specifically, FIG. 2(*a*) illustrates an example, wherein SSB 210 may be transmitted at a different time than SIB1 222 comprising unchanged information 230. FIG. 2(*b*) illustrates an example, wherein SSB 210 may be transmitted on a different frequency than SIB1 222 but at the same time as SIB1 222 comprising unchanged information 230. FIG. 2(*c*) illustrates an example, wherein SSB 210 may be transmitted on a different frequency than CORESET #0 220 and SIB1 222 but at the same time as CORESET #0 220 and SIB1 222.

Figure 3:
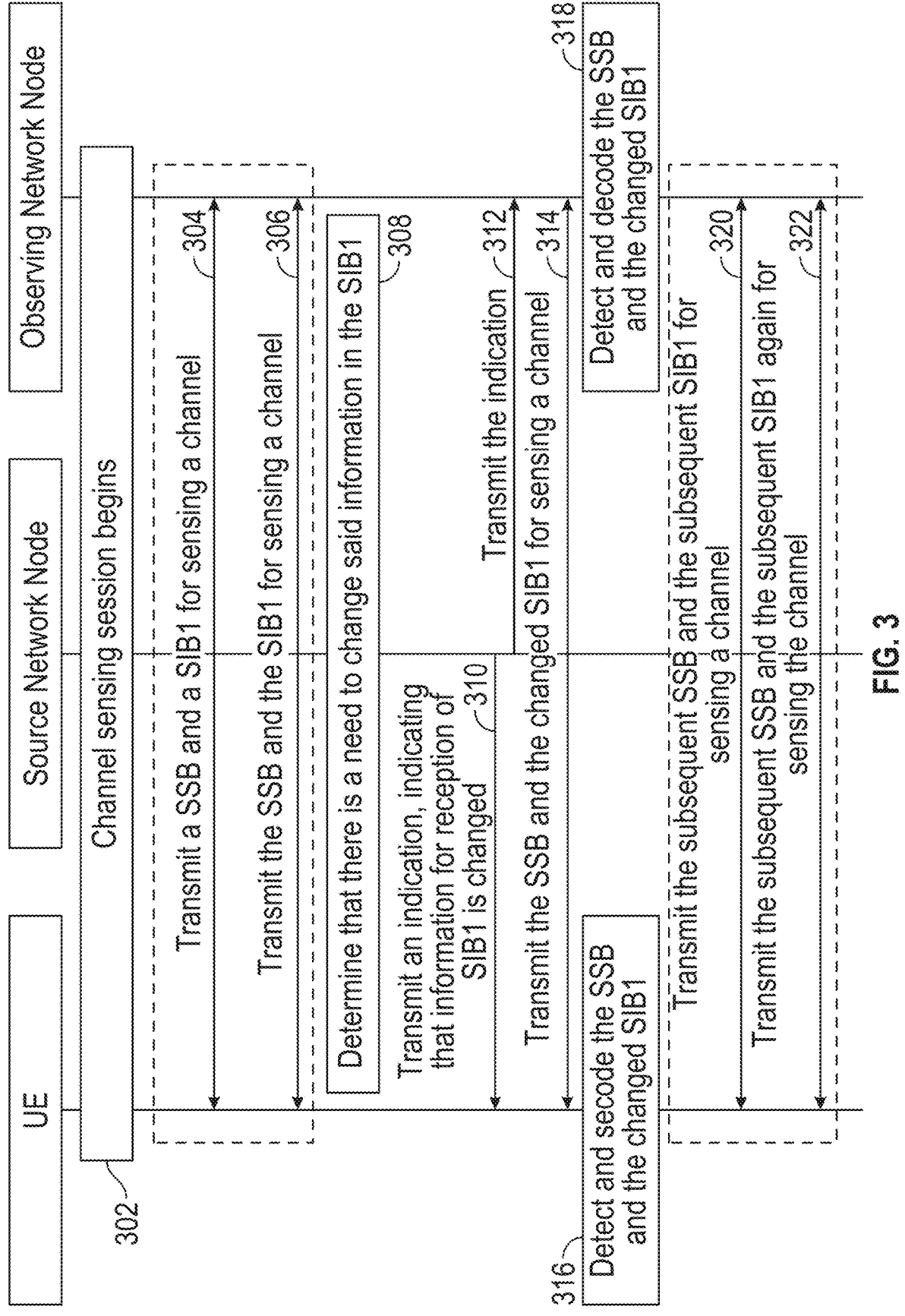
FIG. 3 illustrates a second example in accordance with at least some example embodiments.

FIG. 3 illustrates a second example in accordance with at least some embodiments. On the vertical axes are disposed, from the left to the right, UE 110, source wireless network node 120 and observing wireless network node 122. Time advances from the top towards the bottom.

In some example embodiments, in the beginning of the sensing procedure, UE 110 may indicate its interest on channel sensing, and the sensing session is set up. Such an indication may not be needed in all scenarios. Alternatively, UE 110 may indicate that it supports sensing based on a signal of a wireless network node or that it may leverage SIB1 as a known signal.

Source wireless network node 120 may be configured to transmit SSBs, like SSB 210 illustrated in FIG. 2, CORESET #0 signals, like CORESET #0 220 illustrated in FIG. 2, and SIB1 signals, like SIB1 222 illustrated in FIG. 2. In some example embodiments, source wireless network node 120 may be referred to as a source gNB. In addition to UEs, other wireless network nodes, like observing wireless network node 122, may be involved in the sensing process, either by observing and/or measuring the signals in the considered session or providing more measurement opportunities by additional SSB and SIB1/CORESET #0 transmissions. In some example embodiments, source wireless network node 120 may be involved in the sensing process, e.g., in case of mono-static sensing.

At step 302, channel sensing session may be started. For example, initialization, measurement setup and assistance data may be provided. Source wireless network node 120 may transmit a SSB and a SIB1. UE 110 may detect and decode the SSB and SIB1. UE 110 may determine, based on the decoded SSB and SIB1, information, i.e., content and arrangement, for sensing based on a SSB and at least one part of a SIB1, respectively. Observing wireless network node 122 may determine said information for reception of a SSB and for reception of at least one part of a SIB1 similarly for channel sensing. The decoded SIB1 may referred to as a previously decoded SIB1. After setting up the initial sensing session configurations, UE 110 and observing wireless network node may be able to use SSB and SIB1/CORESET #0 transmissions for channel sensing purposes.

Sensing process may be ongoing at steps 304 and 306. At step 304, source wireless network node 120 may transmit a SSB and a SIB1 for sensing a channel. Similarly, at step 304, source wireless network node 120 may transmit the SSB and the SIB1 again for sensing the channel Consequently, UE 110 and observing wireless network node 122 may receive the SSBs and the SIB1s. The transmissions, at steps 304 and 306, may be beam sweeping transmission.

UE 110 and observing wireless network node 122 may further assume that said information of the at least one part of the SIB1 is unchanged. For instance, UE 110 and observing wireless network node 122 may assume that information in the received CORESET #0, like CORESET #0 220 in FIG. 2, and information in the received SIB1, like SIB1 222 in FIG. 2, are unchanged compared to the previously decoded CORESET #0 and SIB1, like the CORESET #0 and SIB1 transmitted at step 302. The information in the received SIB1 may refer to a format and resources on which the SIB1 (and CORESET #0) are transmitted.

UE 110 and observing wireless network node 122 may then perform sensing with unchanged SIB1 information. That is, UE 110 and observing wireless network node 122 perform channel sensing based on said information of the SSB and said information of the at least one part of the SIB1. Said sensing may be performed using the SIB1 as a known reference signal. Alternatively, reception of the SIB1 may be skipped by UE 110 or at least channel decoding of the SIB1. In some example embodiments, "always on PBCH/SIB" with known content may be used as an additional reference signal, which may be available also for "other-than-sensing" purposes, for example for maintaining frequency/time synch without periodical tracking reference signal). That is, UE 110 and observing wireless network node 122 may perform processing of the first information of the SSB and the second information of the at least one part of the SIB1.

At step 308, source wireless network node 120 may determine that there is a need to change said information in the SIB1. In the occasion of a change in SIB1/CORESET #0, source wireless network node 120 may trigger the change. For example, the change may be triggered if cell load changes considerably and there is a need for additional random access channel resources. Alternatively, or in addition, the change may be triggered due to reconfiguration of some parameters of a serving cell or source wireless network node 120 by an operator.

At step 310, source wireless network node 120 may transmit an indication to UE 110, the indication indicating that information for reception of SIB1 is changed. The indication may be transmitted in a paging message, i.e., source wireless network node 120 may perform paging with indication on the change in the SIB1. Hence, UE 110 may be notified about the change in SIB1, for example, based on a paging message for an idle UE, or specific Radio Resource Control, RRC, signalling for an active UE.

At step 312, source wireless network node 120 may transmit the indication to observing wireless network node 122. For instance, if the SIB1 change occurs in a neighbouring wireless network node, i.e., not source wireless network node 120, the change in SIB1 may be conveyed to UE 110, for example, through an Xn-interface between the neighbouring wireless network node and source wireless network node 120. In addition, observing wireless network node 122 may be indicated about the change in SIB1 using inter-BS interface 127, e.g., using the Xn-interface.

At step 314, source wireless network node 120 may transmit the SSB and the changed SIB1 for sensing a channel. The transmission, at step 314, may be abeam sweeping transmission. At steps 316 and 318, UE 110 and observing wireless network node 122, may detect and decode the SSB and the changed SIB1. The SIB1, decoded at steps 316 and 318, may become a previously decoded SIB1. Hence, UE 110 and observing wireless network node 122 may determine, based on the previously decoded SIB1, information for reception of a subsequent SSB and for reception of at least one part of a subsequent SIB1, for channel sensing.

Sensing process may be again ongoing at steps 320 and 322. At step 320, source wireless network node 120 may transmit the subsequent SSB and the subsequent SIB1 for sensing a channel. Similarly, at step 322, source wireless network node 120 may transmit the subsequent SSB and the subsequent SIB1 again for sensing the channel Consequently, UE 110 and observing wireless network node 122 may receive the subsequent SSBs and the subsequent SIB1s. The transmissions, at steps 320 and 322, may be beam sweeping transmission.

UE 110 and observing wireless network node 122 may further assume that information of the at least one part of the subsequent SIB1 is unchanged, compared to the SIB1 detected and decoded at steps 316 and 318. For instance, UE 110 and observing wireless network node 122 may assume that information in the received CORESET #0, like CORESET #0 220 in FIG. 2, and information in the received SIB1, like SIB1 222 in FIG. 2, are unchanged compared to the previously decoded SIB1. UE 110 and observing wireless network node 122 may then perform sensing with unchanged SIB1 information. That is, UE 110 and observing wireless network node 122 may perform channel sensing based on said information of the SSB, i.e., the first information and said information of the at least one part of the SIB1, i.e., the second information.

That is, UE 110 and observing wireless network node 122 may perform processing of the first information of the SSB and the second information of the at least one part of the SIB1. The processing of the first information and the second information may be performed by performing at least one of the following: channel sensing, skipping reception of the SIB1, skipping channel decoding of the SIB1, or considering the SIB1 as a known signal.

Figure 4:
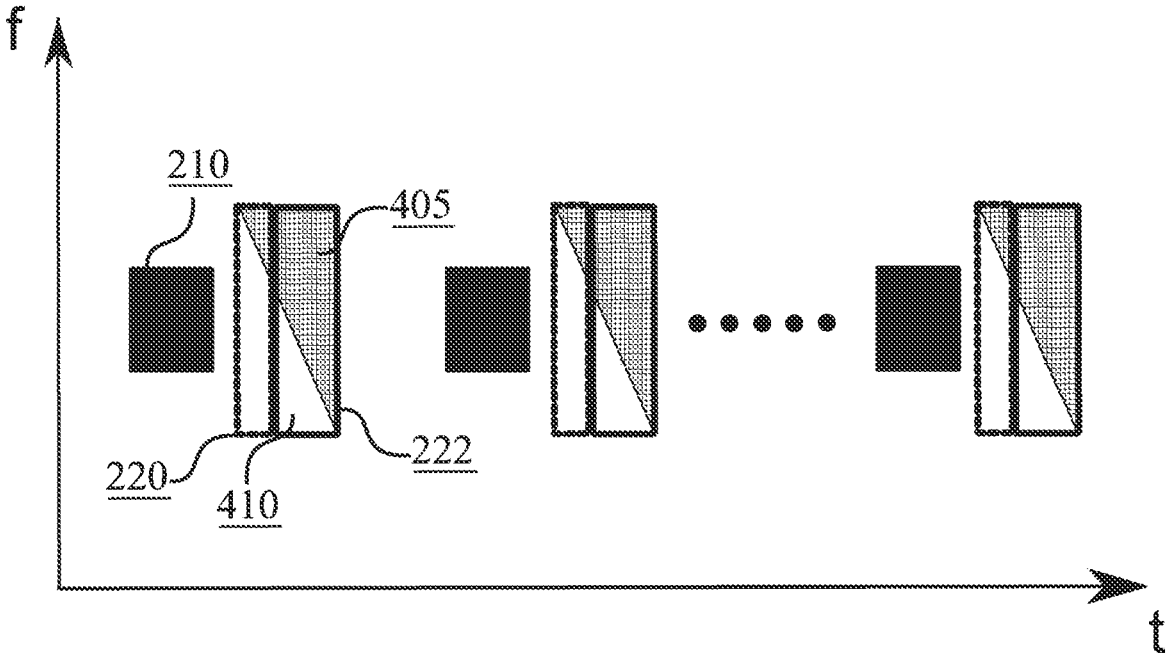
FIG. 4 illustrates a third example in accordance with at least some example embodiments.

FIG. 4 illustrates a third example in accordance with at least some embodiments. In FIG. 4, SSB 210, CORESET #0 220 and SIB1 222 are illustrated as in FIG. 2. In addition, unhanged, first part is denoted by 405 and variable, second part is denoted by 410. As illustrated in FIG. 4, CORESET #0 220 and SIB1 222 may be divided into two parts. First part 405 may comprise unchanged SIB1 and/or CORESET #0 information, valid for sensing the channel and a second part 410 may comprise variable SIB1 and/or CORESET #0 information, invalid for sensing. That is, first part 405 of SIB 222 may comprise unchanged information, compared to a previously decoded SIB1, and second part 410 of SIB 222 may comprise variable information.

In some example embodiments, first part 405 comprising unchanged SIB1/CORESET #0 information may comprise persistent information similar to the PBCH. In case of any change in first part 405 comprising unchanged information, a cell reset procedure may be used. Second part 410 of SIB1/CORESET #0 information may be freely varied in time-sensitive manner, as it might not be considered for sensing measurements.

In some example embodiments, the split between the two parts may be different for CORESET #0 220 and SIB1 222. For instance, SIB1 222 may comprise of unchanged part 405 and variable part 410 while CORESET #0 220 may be unchanged. For instance, Control Channel Elements, CCEs, within CORESET #0 220 used for type #0 PDCCH may be unchanged. SSB 210, and the PBCH, may be always unchanged.

In FIG. 4, the diagonal split of the SIB1/CORESET #0 block represents the possibility of having different multiplexing options for the unchanged and variable parts. Moreover, multiplexing of unchanged and variable parts in the SIB1/CORESET #0 block may be performed in time and/or frequency domain, comprising also a possibility for comb-like structures. The exact split between the two parts may be indicated to all involved observers, like UE 110 and/or observing wireless network node 122, in the beginning of the sensing process. Alternatively, the split may be defined in a standard, like a 3GPP standard.

Figure 5:
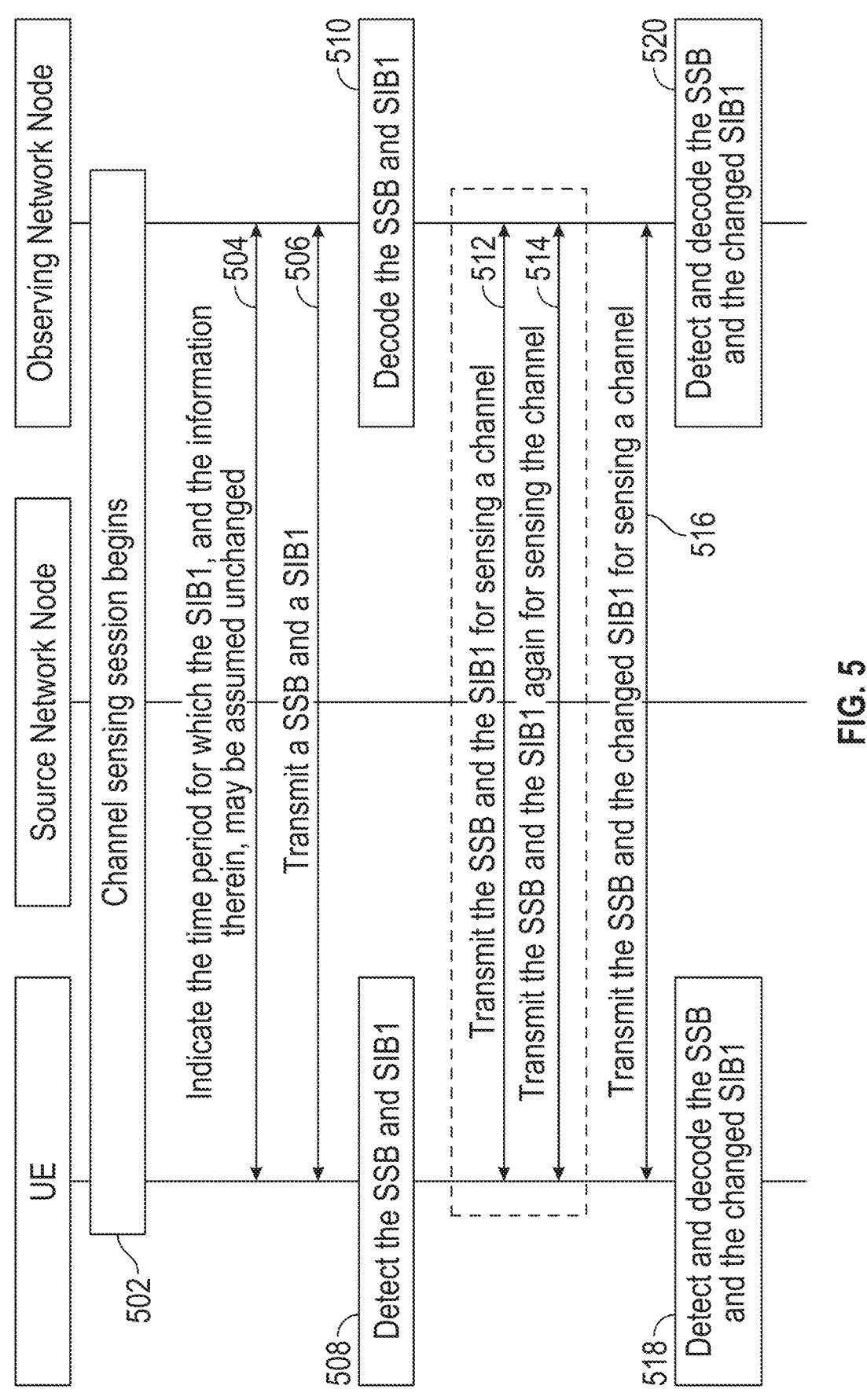
FIG. 5 illustrates a fourth example in accordance with at least some example embodiments.

FIG. 5 illustrates a fourth example in accordance with at least some embodiments. On the vertical axes are disposed, from the left to the right, UE 110, source wireless network node 120 and observing wireless network node 122. Time advances from the top towards the bottom. The fourth example illustrated in FIG. 5 is similar compared to the second example illustrated in FIG. 3, because in both examples a sensing device, like UE 110 and/or observing wireless network node 122 may assume that a SIB1 is unchanged, compared to a previously decoded SIB1. However, unlike in the second example illustrated in FIG. 3, wherein any changes in the SIB1 information may be signalled by source wireless network node 120, in the fourth example illustrated in FIG. 5 the SIB1 may be considered as unchanged for a predefined time period, i.e., over a given time period.

Step 502 may correspond to step 302. After setting up the initial sensing session configurations, source wireless network node 120 may indicate at step 504, the time period for which the SIB1, and the information therein, may be assumed unchanged.

At step 506, source wireless network node 120 may transmit a SSB and a SIB1. UE 110 and observing wireless network node 122 may detect and decode the SSB and SIB1, at steps 508 and 510, respectively. UE 110 and observing wireless network node 122 may then determine, based on the decoded SSB and the decoded SIB1 information, i.e., content and arrangement, for sensing based on a SSB and at least one part of a SIB1, respectively Sensing with unchanged SIB1 may be ongoing for the predetermined time period at steps 512 and 514. At step 512, source wireless network node 120 may transmit the SSB and the SIB1 for sensing a channel. Similarly, at step 514, source wireless network node 120 may transmit the SSB and the SIB1 again for sensing the channel. Consequently, UE 110 and observing wireless network node 122 may receive the SSBs and the SIB1s. UE 110 and observing wireless network node 122 may then perform channel sensing based on said information of the SSB and said information of the at least one part of the SIB1. The transmissions, at steps 512 and 514, may be beam sweeping transmission.

That is, UE 110 and observing wireless network node 122 may perform processing of the first information of the SSB and the second information of the at least one part of the SIB1. The processing of the first information and the second information may be performed by performing at least one of the following: channel sensing, skipping reception of the SIB1, skipping channel decoding of the SIB1, or considering the SIB1 as a known signal.

After the time period expires, i.e., after step 514, UE 110 and observing wireless network node 122 must again decode a SSB and a SIB1 if they wish to continue the sensing process. Alternatively, observing wireless network node 122 may be informed about a SIB1 change using interface 127. Source wireless network node 120 may determine that there is a need to change said information in the SIB1 and, at step 516, transmit the SSB and the changed SIB1 for sensing a channel. The transmission, at step 516, may be a beam sweeping transmission. At steps 518 and 520, UE 110 and observing wireless network node 122, may detect and decode the SSB and the changed SIB1. The decoded changed SIB1 may be considered as a previously decoded SIB1. Hence, UE 110 and observing wireless network node 122 may detect and decode a SIB1 after the end of the time period, based on the previously decoded SIB1.

That is, UE 110 and observing wireless network node 122 may perform processing of the first information of the SSB and the second information of the at least one part of the SIB1. The processing of the first information and the second information may be performed by performing at least one of the following: channel sensing, skipping reception of the SIB1, skipping channel decoding of the SIB1, or considering the SIB1 as a known signal.

If needed, source wireless network node 120 may modify the time period during the sensing process by signalling a new time period to UE 110 and observing wireless network node 122. Signalling between source wireless network node 120 and observing wireless network node 122 may be performed via inter-BS interface 127, e.g., using an Xn-interface.

In some example embodiments, even though information in a SIB1 may change, predefined content, resources and/or format for SIB1 may not change. That is, a payload, time and frequency resources, coding, modulation, etc. are not changed. In the case of type #0 PDCCH, the payload, aggregation level or CORESET #0 resources used for type #0 PDCCH may not be changed. UE 110 may obtain such information when it decodes SIB1 correctly. That is, even though the SIB1 content, e.g., parameter values may change, the SIB1 size, and transmission parameters might not change.

In some example embodiments, a joint use of SSBs and SIB1s is therefore enabled, for example for bi-static sensing. Compared to using only SSBs, the joint use of SSBs and SIB1s may provide wider bandwidth and enhanced measurement time-granularity. Hence, sensing performance, such as ranging accuracy and velocity estimation accuracy, may be improved substantially without increasing radio interface overhead.

In some example embodiments, each SSB may be divided into three parts, given as PSS, SSS and PBCH. The duration of a single SSB may be 4 Orthogonal Frequency Division Multiplexing, OFDM, symbols. The OFDM symbols may span over 240 subcarriers in frequency domain. With a subcarrier spacing of 240 kHZ, a SSB transmission may reach its maximum bandwidth of 57.6 MHz. For example in Frequency Range 1, FR1, and FR2, SSBs may be transmitted using beam sweeping. A set of SSBs may be transmitted with a full cycle of SSB-wise beams and referred to as a Synchronization Signal, SS, burst set. Depending on the used carrier frequency, one SS burst set may comprise a transmission of 1-64 beamformed SSBs. The duration of a single SS burst set may be always limited to 5 ms, and the full SS burst may be periodically repeated in every 5-160 ms. However, UEs performing an initial cell search may assume a maximum SS burst set interval of 20 ms.

Regarding sensing aspects, SSBs may offer an always-on signal which may be broadcasted over the complete cell area, and sensing can be carried in both idle and active states. However, due to the low bandwidth used for SSBs, the accuracy of SSB-based sensing may be rather limited. In addition, if only four consecutive OFDM symbols would be used a single SSB, the velocity accuracy estimation would be restricted.

In some example embodiments, SIBs may carry system information regarding the current cell as well as neighbouring cells and related carriers. From multiple SIB types, the essential information on accessing the system may be found from SIB1, which may be transmitted periodically and frequently enough for each SSB beam over the whole cell. However, in some example embodiments, a wireless network node may decide whether or not to transmit a SIB1 associated to certain SSB transmission. After decoding a MIB carried by the SSB in PBCH, decoding of SIB1, sometimes referred to as Remaining Minimum System Information, RMSI, may be needed in order to initiate the random access process. For this reason SIB1 may be transmitted in every 160 ms scheduled as common PDSCH transmissions.

The scheduling of SIB1 may be monitored through an associated CORESET information, referred to as type #0 PDCCH or CORESET #0, whose resources in terms of search space may be indicated in the PBCH. Depending on the used Demodulation Reference Signal, DMRS, configuration, the CORESET #0 block may be 1-3 OFDM symbols long. In frequency domain, a CORESET #0 may be assigned to multiples of 6 PRBs and upper limited by the carrier bandwidth. In some example embodiments, CORESET #0 transmission may refer to a type #0 PDCCH transmission on CORESET #0. A type #0 PDCCH may occupy whole CORESET #0 or only a portion of CORESET #0 resources, depending on the CORESET #0 size and aggregation level used for type #0 PDCCH.

From the channel sensing perspective, SIB1 and associated CORESET #0, which may be transmitted in identical directions with the SSBs, may be exploited to offer a significant increase in bandwidth compared to SSB. In addition, compared to SSB, SIB1 and CORESET #0 may be used to provide a larger number of consecutive OFDM symbols. Therefore, together with the extended bandwidth and time duration, the sensing performance in terms of ranging and velocity estimation accuracy may be considerably improved compared to SSB. However, unlike with the SSBs, the information on SIB1/CORESET #0 may not be fixed and may need to be occasionally modified, although the modification rate may be considered very low.

Figure 6:
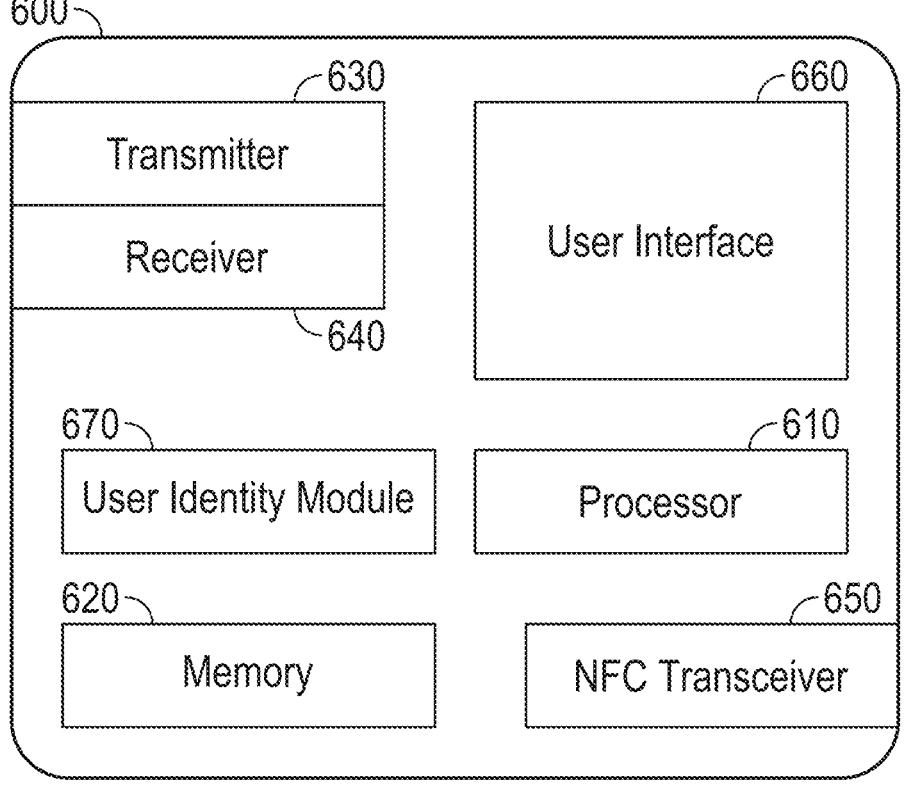
FIG. 6 illustrates an example apparatus capable of supporting at least some example embodiments.

FIG. 6 illustrates an example apparatus capable of supporting at least some example embodiments. Illustrated is device 600, which may comprise, for example, UE 110, source wireless network node 120 or observing wireless network node 122, or a control device configured to control the functioning thereof, possibly when installed therein. Comprised in device 600 is processor 610, which may comprise, for example, a single- or multi-core processor wherein a single-core processor comprises one processing core and a multi-core processor comprises more than one processing core. Processor 610 may comprise, in general, a control device. Processor 610 may comprise more than one processor. Processor 610 may be a control device. A processing core may comprise, for example, a Cortex-A8 processing core manufactured by ARM Holdings or a Steamroller processing core produced by Advanced Micro Devices Corporation. Processor 610 may comprise at least one Qualcomm Snapdragon and/or Intel Atom processor. Processor 610 may comprise at least one application-specific integrated circuit, ASIC. Processor 610 may comprise at least one field-programmable gate array, FPGA. Processor 610 may be means for performing method steps in device 600. Processor 610 may be configured, at least in part by computer instructions, to perform actions.

A processor may comprise circuitry, or be constituted as circuitry or circuitries, the circuitry or circuitries being configured to perform phases of methods in accordance with example embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 600 may comprise memory 620. Memory 620 may comprise random-access memory and/or permanent memory. Memory 620 may comprise at least one RAM chip. Memory 620 may comprise solid-state, magnetic, optical and/or holographic memory, for example. Memory 620 may be at least in part accessible to processor 610. Memory 620 may be at least in part comprised in processor 610. Memory 620 may be means for storing information. Memory 620 may comprise computer instructions that processor 610 is configured to execute. When computer instructions configured to cause processor 610 to perform certain actions are stored in memory 620, and device 600 overall is configured to run under the direction of processor 610 using computer instructions from memory 620, processor 610 and/or its at least one processing core may be considered to be configured to perform said certain actions. Memory 620 may be at least in part comprised in processor 610. Memory 620 may be at least in part external to device 600 but accessible to device 600.

Device 600 may comprise a transmitter 630. Device 600 may comprise a receiver 640. Transmitter 630 and receiver 640 may be configured to transmit and receive, respectively, information in accordance with at least one cellular or non-cellular standard. Transmitter 630 may comprise more than one transmitter. Receiver 640 may comprise more than one receiver. Transmitter 630 and/or receiver 640 may be configured to operate in accordance with Global System for Mobile communication, GSM, Wideband Code Division Multiple Access, WCDMA, Long Term Evolution, LTE, and/or 5G/NR standards, for example.

Device 600 may comprise a Near-Field Communication, NFC, transceiver 650. NFC transceiver 650 may support at least one NFC technology, such as Bluetooth, Wibree or similar technologies.

Device 600 may comprise User Interface, UI, 660. UI 660 may comprise at least one of a display, a keyboard, a touchscreen, a vibrator arranged to signal to a user by causing device 600 to vibrate, a speaker and a microphone. A user may be able to operate device 600 via UI 660, for example to accept incoming telephone calls, to originate telephone calls or video calls, to browse the Internet, to manage digital files stored in memory 620 or on a cloud accessible via transmitter 630 and receiver 640, or via NFC transceiver 650, and/or to play games.

Device 600 may comprise or be arranged to accept a user identity module 670. User identity module 670 may comprise, for example, a Subscriber Identity Module, SIM, card installable in device 600. A user identity module 670 may comprise information identifying a subscription of a user of device 600. A user identity module 670 may comprise cryptographic information usable to verify the identity of a user of device 600 and/or to facilitate encryption of communicated information and billing of the user of device 600 for communication effected via device 600.

Processor 610 may be furnished with a transmitter arranged to output information from processor 610, via electrical leads internal to device 600, to other devices comprised in device 600. Such a transmitter may comprise a serial bus transmitter arranged to, for example, output information via at least one electrical lead to memory 620 for storage therein. Alternatively to a serial bus, the transmitter may comprise a parallel bus transmitter. Likewise processor 610 may comprise a receiver arranged to receive information in processor 610, via electrical leads internal to device 600, from other devices comprised in device 600. Such a receiver may comprise a serial bus receiver arranged to, for example, receive information via at least one electrical lead from receiver 640 for processing in processor 610. Alternatively to a serial bus, the receiver may comprise a parallel bus receiver.

Device 600 may comprise further devices not illustrated in FIG. 6. For example, where device 600 comprises a smartphone, it may comprise at least one digital camera. Some devices 600 may comprise a back-facing camera and a front-facing camera, wherein the back-facing camera may be intended for digital photography and the front-facing camera for video telephony. Device 600 may comprise a fingerprint sensor arranged to authenticate, at least in part, a user of device 600. In some example embodiments, device 600 lacks at least one device described above. For example, some devices 600 may lack a NFC transceiver 650 and/or user identity module 670.

Processor 610, memory 620, transmitter 630, receiver 640, NFC transceiver 650, UI 660 and/or user identity module 670 may be interconnected by electrical leads internal to device 600 in a multitude of different ways. For example, each of the aforementioned devices may be separately connected to a master bus internal to device 600, to allow for the devices to exchange information. However, as the skilled person will appreciate, this is only one example and depending on the example embodiment, various ways of interconnecting at least two of the aforementioned devices may be selected without departing from the scope of the example embodiments.

FIG. 7 is a flow graph of a first method in accordance with at least some example embodiments. The apparatus of the first method may be UE 110 or observing wireless network node 122, or a control device configured to control the functioning thereof, possibly when installed therein. That is, the steps of the first method may be performed by UE 110 or observing wireless network node 122, or by a control device configured to control the functioning thereof, possibly when installed therein.

The first method may comprise, at step 710, determining, by an apparatus, first information for reception of a synchronization signal block from a cell of a source wireless network node. The first method may also comprise, at step 720, determining, by the apparatus, second information for reception of at least one part of a system information block from the cell of the source wireless network node, wherein the second information is unchanged compared to at least one part of a previous system information block. The first method may further comprise, at step 730, receiving, by the apparatus, the synchronization signal block and the system information block. Finally, the first method may comprise, at step 740, performing, by the apparatus, processing of the first information of the synchronization signal block and the second information of the at least one part of the system information block.

It is to be understood that the example embodiments disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular example embodiments only and is not intended to be limiting.

Reference throughout this specification to one example embodiment or an example embodiment means that a particular feature, structure, or characteristic described in connection with the example embodiment is included in at least one example embodiment. Thus, appearances of the phrases "in one example embodiment" or "in an example embodiment" in various places throughout this specification are not necessarily all referring to the same example embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various example embodiments and examples may be referred to herein along with alternatives for the various components thereof. It is understood that such example embodiments, examples, and alternatives are not to be construed as de facto equivalents of one another, but are to be considered as separate and autonomous representations.

In an example embodiment, an apparatus, such as, for example, UE 110, source wireless network node 120 or observing wireless network node 122, may comprise means for carrying out the example embodiments described above and any combination thereof.

In an example embodiment, a computer program may be configured to cause a method in accordance with the example embodiments described above and any combination thereof. In an example embodiment, a computer program product, embodied on a non-transitory computer readable medium, may be configured to control a processor to perform a process comprising the example embodiments described above and any combination thereof.

In an example embodiment, an apparatus, such as, for example, UE 110, source wireless network node 120 or observing wireless network node 122, may comprise at least one processor and at least one memory storing instructions that, when executed by the at least one processor, cause the apparatus at least to perform the example embodiments described above and any combination thereof.

Furthermore, the described features, structures, or characteristics may be combined in any suitable manner in one or more example embodiments. In the preceding description, numerous specific details are provided, such as examples of lengths, widths, shapes, etc., to provide a thorough understanding of example embodiments of the disclosure. One skilled in the relevant art will recognize, however, that the disclosure can be practiced without one or more of the specific details, or with other methods, components, materials, etc. In other instances, well-known structures, materials, or operations are not shown or described in detail to avoid obscuring aspects of the disclosure.

While the forgoing examples are illustrative of the principles of the example embodiments in one or more particular applications, it will be apparent to those of ordinary skill in the art that numerous modifications in form, usage and details of implementation can be made without the exercise of inventive faculty, and without departing from the principles and concepts of the disclosure. Accordingly, it is not intended that the disclosure be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some example embodiments find industrial application in cellular communication networks, for example in 3GPP networks.

Acronyms List

3GPP 3rd Generation Partnership Project
CCE Control Channel Element
CU Centralized Unit
DCI Downlink Control Information
DMRS Demodulation Reference Signal
DU Distributed Unit
FR Frequency Range
GSM Global System for Mobile communication
IAB Integrated Access and Backhaul
JCAS Joint Communication and Sensing
LTE Long-Term Evolution
M2M Machine-to-Machine
MIB Master Information Block
MT Mobile Termination
NFC Near-Field Communication
OFDM Orthogonal Frequency Division Multiplexing
PBCH Physical Broadcast Channel
PDCCH Physical Downlink Control Channel
PDSCH Physical Downlink Shared Channel
PSS Primary Synchronization Signal
RAT Radio Access Technology
RMSI Remaining Minimum System Information
RRC Radio Resource Control
SIB System Information Block
SSB Synchronization Signal Block
SS Synchronization Signal
SSS Secondary Synchronization Signal
TRP Transmission and Reception Point
UE User Equipment
UL Uplink
UI User Interface
WCDMA Wideband Code Division Multiple Access
WiMAX Worldwide Interoperability for Microwave Access
WLAN Wireless Local Area Network

| REFERENCE SIGNS LIST | |
|---|---|
| 110 | UE |
| 115 | Air interface |
| 120 | Source wireless network node |
| 122 | Observing wireless network node |
| 125, 135 | Wired interfaces |
| 130 | Core Network |
| 210 | SSB |
| 220 | CORESET#0 |
| 222 | SIB1 |
| 230, 405 | Unchanged information (first part) |
| 302-322 | Steps in FIG. 3 |
| 410 | Variable information (second part) |
| 502-520 | Steps in FIG. 5 |
| 600-670 | Structure of the apparatus of FIG. 6 |
| 710-740 | Phases of the first method in FIG. 7 |

The invention claimed is:

1. An apparatus comprising:
at least one processor; and
at least one memory storing instructions that, when executed by the at least one processor, cause the apparatus at least to:

determine first information for reception of a synchronization signal block from a cell of a source wireless network node;

determine second information for reception of at least one part of a system information block from the cell of the source wireless network node, wherein the second information is unchanged compared to at least one part of a previous system information block;

determine third information for reception of a physical downlink control channel from the cell of the source wireless network node, wherein the third information is unchanged compared to a previous physical downlink channel;

receive the synchronization signal block, the system information block, and the physical downlink channel;

perform processing of the first information of the synchronization signal block and the second information of the at least one part of the system information block; and perform channel sensing based on the first information of the synchronization signal block and the second information of the at least one part of the system information block and the third information of the physical downlink control channel.

2. The apparatus according to claim 1, wherein the stored instructions further cause, when executed by the at least one processor, the apparatus at least to:

perform the processing of the first information and the second information by performing at least one of the following: channel sensing, skipping reception of the system information block, skipping channel decoding of the system information block, or considering the system information block as a known signal.

3. The apparatus according to claim 1, wherein the system information block is a System Information Block 1.

4. The apparatus according to claim 1, wherein the system information block has a predetermined periodicity.

5. The apparatus according to claim 1, wherein the at least one part of the system information block comprises unchanged information compared to the previous system information block.

6. The apparatus according to claim 1, wherein the stored instructions further cause, when executed by the at least one processor, the apparatus at least to:

receive an indication from the wireless network node, the indication indicating that the second information of the at least one part of the system information block is changed.

7. The apparatus according to claim 1, wherein the system information block comprises the at least one part comprising the second information unchanged compared to a previous system information block and at least one other part comprising variable information compared to the previous system information block.

8. The apparatus according to claim 7, wherein the part and the at least one other part of the system information block are multiplexed in at least one of time or frequency.

9. The apparatus according claim 1, wherein the at least one part of the system information block comprises unchanged information compared to the previous system information block, wherein the unchanged information is valid for a time period.

10. The apparatus according to claim 9, wherein the stored instructions further cause, when executed by the at least one processor, the apparatus at least to:

detect and decode another system information block after an end of the time period; and determine, based on the decoded another system information block, information for reception of at least one part of a subsequent system information block from the cell of the source wireless network node.

11. A method, comprising:

determining, by an apparatus, first information for reception of a synchronization signal block from a cell of a source wireless network node;

determining, by the apparatus, second information for reception of at least one part of a system information block from the cell of the source wireless network node, wherein the second information is unchanged compared to at least one part of a previous system information block;

determining, by the apparatus, third information for reception of a physical downlink control channel from the cell of the source wireless network node, wherein the third information is unchanged compared to a previous physical downlink channel;

receiving, by the apparatus, the synchronization signal block, the system information block, and the physical downlink control channel;

performing, by the apparatus, processing of the first information of the synchronization signal block and the second information of the at least one part of the system information block; and performing, by the apparatus, channel sensing based on the first information of the synchronization signal block and the second information of the at least one part of the system information block and the third information of the physical downlink control channel.

12. The method according to claim 11, further comprising:

performing the processing of the first information and the second information by performing at least one of the following: channel sensing, skipping reception of the system information block, skipping channel decoding of the system information block, or considering the system information block as a known signal.

13. The method according to claim 11, wherein the at least one part of the system information block comprises unchanged information compared to the previous system information block.

14. The method according to claim 11, further comprising:

receiving an indication from the wireless network node, the indication indicating that the second information of the at least one part of the system information block is changed.

15. The method according to claim 11, wherein the system information block comprises the at least one part comprising the second information unchanged compared to a previous system information block and at least one other part comprising variable information compared to the previous system information block.

16. The method according claim 11, wherein the at least one part of the system information block comprises unchanged information compared to the previous system information block, wherein the unchanged information is valid for a time period.

17. The method according to claim 16, further comprising:

detecting and decode another system information block after an end of the time period; and

determining, based on the decoded another system infor-
mation block, information for reception of at least one
part of a subsequent system information block from the
cell of the source wireless network node.

* * * * *